US008857066B2

(12) United States Patent
Haman

(10) Patent No.: US 8,857,066 B2
(45) Date of Patent: Oct. 14, 2014

(54) POWER SAW INCLUDING AN IMPACT MECHANISM

(75) Inventor: Brian Haman, Cary, IL (US)

(73) Assignee: Robert Bosch GmbH, Stuttgart (DE)

( * ) Notice: Subject to any disclaimer, the term of this patent is extended or adjusted under 35 U.S.C. 154(b) by 337 days.

(21) Appl. No.: 13/214,435

(22) Filed: Aug. 22, 2011

(65) Prior Publication Data

US 2013/0047448 A1 Feb. 28, 2013

(51) Int. Cl.

| | |
|---|---|
| ***B23D 45/16*** | (2006.01) |
| ***B23D 47/12*** | (2006.01) |
| ***B23D 49/00*** | (2006.01) |
| ***B23D 51/16*** | (2006.01) |
| ***B23D 47/02*** | (2006.01) |

(52) U.S. Cl.

CPC ................ *B23D 47/02* (2013.01); *B23D 51/16* (2013.01)

USPC .................... 30/388; 30/389; 30/392; 30/394

(58) Field of Classification Search

USPC .................... 30/370, 371, 374–377, 388–394

See application file for complete search history.

(56) References Cited

U.S. PATENT DOCUMENTS

| | | | | |
|---|---|---|---|---|
| 1,900,553 | A | 3/1933 | Hampton | |
| 3,867,988 | A | 2/1975 | Koehler | |
| 5,689,891 | A | 11/1997 | Bednar et al. | |
| 5,755,292 | A | 5/1998 | Nilsson et al. | |
| 6,282,797 | B1 * | 9/2001 | Osada et al. | 30/392 |
| 6,694,625 | B1 * | 2/2004 | Wright | 30/392 |
| 6,877,235 | B2 * | 4/2005 | Osada | 30/394 |
| 7,513,047 | B2 * | 4/2009 | Wu | 30/392 |
| 8,033,026 | B2 * | 10/2011 | Gibbons et al. | 30/392 |
| 2004/0261274 | A1 * | 12/2004 | Tam et al. | 30/392 |
| 2011/0162218 | A1 * | 7/2011 | Roise et al. | 30/377 |
| 2011/0255927 | A1 * | 10/2011 | Boudreau et al. | 173/47 |
| 2013/0061480 | A1 * | 3/2013 | Baskar et al. | 30/371 |

FOREIGN PATENT DOCUMENTS

| | | | |
|---|---|---|---|
| DE | 7828132 | U1 | 2/1979 |
| EP | 1048420 | A2 | 11/2000 |
| WO | WO 2013028536 | A1 * | 2/2013 |

OTHER PUBLICATIONS

International Search Report and Written Opinion in corresponding PCT Application (i.e., PCT/US2012/051401, mailed Nov. 7, 2012 (10 pages).

* cited by examiner

*Primary Examiner* — Jason Daniel Prone

(74) *Attorney, Agent, or Firm* — Maginot, Moore & Beck

(57) ABSTRACT

A power saw includes an electric motor, an impact assembly, and a blade retaining assembly. The impact assembly is coupled to an output shaft and includes a hammer member and an anvil member. The blade retaining assembly is coupled to the impact assembly and includes a blade coupling configured to connect to a saw blade. The impact assembly is configured to operate in a first mode when a mechanical load on the blade retaining assembly is below a threshold value. The impact assembly is configured to operate in a second mode when the mechanical load on the blade retaining assembly is greater than or equal to the threshold value. The hammer member is maintained in a fixed position relative to the anvil member when the impact assembly operates in the first mode. The hammer member intermittently impacts the anvil member when the impact assembly operates in the second mode.

8 Claims, 9 Drawing Sheets

128
126

124
248
104
120
112
116
144
148
168
136
146
100
108
132
196
140

POWER SAW INCLUDING AN IMPACT MECHANISM

FIELD

The present disclosure relates to power saws, and in particular to portable power saws.

BACKGROUND

Portable power saws are used to cut construction lumber, building products, and other materials. A typical portable power saw includes a blade assembly and an electric motor. The blade assembly is used to removably connect a saw blade to the power saw. The electric motor is coupled to the blade assembly and, when activated, causes a portion of the blade assembly and the saw blade to move relative to an enclosure of the portable power saw. Specifically, the electric motor may cause the saw blade to rotate, reciprocate, and/or oscillate. For example, the electric motor of a circular power saw rotates a circular saw blade connected to the blade assembly. Whereas, the electric motor of a reciprocating power saw, reciprocates the saw blade connected to the blade assembly.

To cut a workpiece with a typical portable power saw, a user places the moving saw blade in contact with the workpiece and then moves the power saw along a desired cutting path. As the moving saw blade contacts the workpiece, a cutting edge of the saw blade removes a small amount of the workpiece, thereby forming a small slice or groove in the workpiece, which is referred to as a kerf.

Generally, it is desirable for a portable power saw to have the capacity to cut a wide variety of materials. When cutting some materials, however, the saw blade may become bound or jammed within the kerf. This undesirable situation may cause damage to the workpiece and/or to the saw mechanism. Additionally, when the saw blade is bound or jammed within the kerf, activation of the electric motor may damage the saw blade. When the saw blade is damaged the user repairs or replaces the saw blade before additional workpieces are cut. Accordingly, it would be desirable to provide a portable power saw that is capable of cutting a wide variety of materials without binding or jamming the saw blade in the workpiece.

SUMMARY

According to one embodiment of the present disclosure a power saw includes an electric motor, an impact assembly, and a blade retaining assembly. The electric motor includes an output shaft. The impact assembly is coupled to the output shaft and includes a hammer member and an anvil member. The blade retaining assembly is coupled to the impact assembly and includes a blade coupling configured to connect to a saw blade. The impact assembly is configured to operate in a first mode when a mechanical load on the blade retaining assembly is below a threshold value. The impact assembly is configured to operate in a second mode when the mechanical load on the blade retaining assembly is greater than or equal to the threshold value. The hammer member is maintained in a fixed position relative to the anvil member when the impact assembly operates in the first mode. The hammer member intermittently impacts the anvil member when the impact assembly operates in the second mode.

According to another embodiment of the present disclosure, a power saw includes an electric motor, a blade retaining assembly, and an impact assembly. The electric motor includes an output shaft. The blade retaining assembly includes a blade coupling configured to connect to a saw blade. The impact assembly is coupled to the output shaft and the blade retaining assembly. The impact assembly is configured (i) to operate without generating torque pulses when a mechanical load on the blade retaining assembly is below a threshold value, and (ii) to generate torque pulses when the mechanical load on the blade retaining assembly is greater than or equal to the threshold value.

According to yet another embodiment of the present disclosure, a power saw includes an electric motor, an impact assembly, a reciprocating assembly, and a blade retaining assembly. The electric motor includes an output shaft. The impact assembly is coupled to the output shaft and includes a hammer member and an anvil member. The reciprocating assembly is coupled to the impact assembly. The blade retaining assembly is coupled to the reciprocating assembly and includes a blade coupling configured to connect to a saw blade. The impact assembly is configured to operate in a first mode when a mechanical load on the reciprocating assembly is below a threshold value. The impact assembly is configured to operate in a second mode when the mechanical load on the blade retaining assembly is greater than or equal to the threshold value. The hammer member is maintained in a fixed position relative to the anvil member when the impact assembly operates in the first mode. The hammer member moves relative to the anvil member when the impact assembly operates in the second mode.

BRIEF DESCRIPTION OF THE DRAWINGS

The above-described features and advantages, as well as other, should become more readily apparent to those of ordinary skill in the art by reference to the following detailed description and the accompanying figures in which.

DETAILED DESCRIPTION

Figure 1:
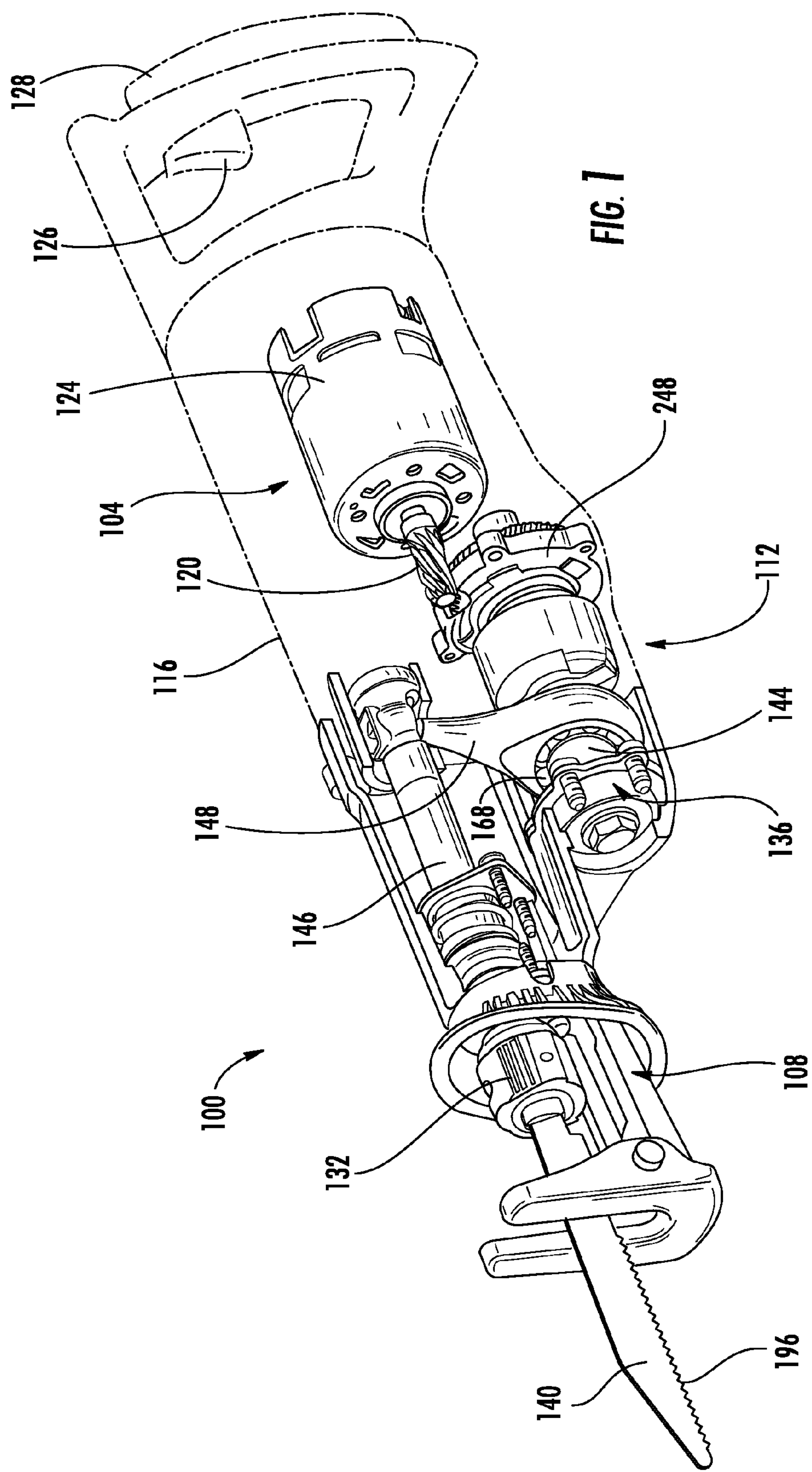
FIG. 1 is a cutaway perspective view of a power saw according to the present disclosure, wherein the power saw includes an impact mechanism having a hammer member and an anvil member.

As shown in FIG. 1, a power saw 100 includes an electric motor 104, a blade retaining assembly 108, and an impact assembly 112 each positioned at least partially with an enclosure 116. As described herein, the electric motor 104 is configured to drive a blade 140 coupled to the blade retaining assembly 108. The impact assembly 112 is positioned between the electric motor 104 and the blade retaining assembly 108 and is configured to prevent binding or jamming of the blade 140 when the power saw 100 is used to cut a workpiece.

The electric motor 104 includes an output shaft 120, which extends from a motor housing 124. The output shaft 120 includes a geared portion that is either connected to or integral with the output shaft. When the electric motor 104 is connected to a source of electrical energy, the output shaft 120 rotates relative to the motor housing 124. A battery assembly 128 is electrically coupled to the electric motor 104 and supplies the electric motor with electrical energy. The electric motor 104 may also be supplied with electrical energy through a standard wall outlet coupled to an alternating current supply. A trigger switch 126 is moved to an activated position to couple the electric motor 104 with the source of electrical energy. When the electric motor 104 is coupled to the source of electrical energy the blade retaining assembly 108 reciprocates the blade 140.

The blade retaining assembly 108 is coupled to the impact assembly 112 and includes a blade coupling 132 and a reciprocating apparatus 136. The blade coupling 132 is partially positioned within the enclosure 116 and is configured for reciprocating movement relative to the enclosure.

Figure 2:
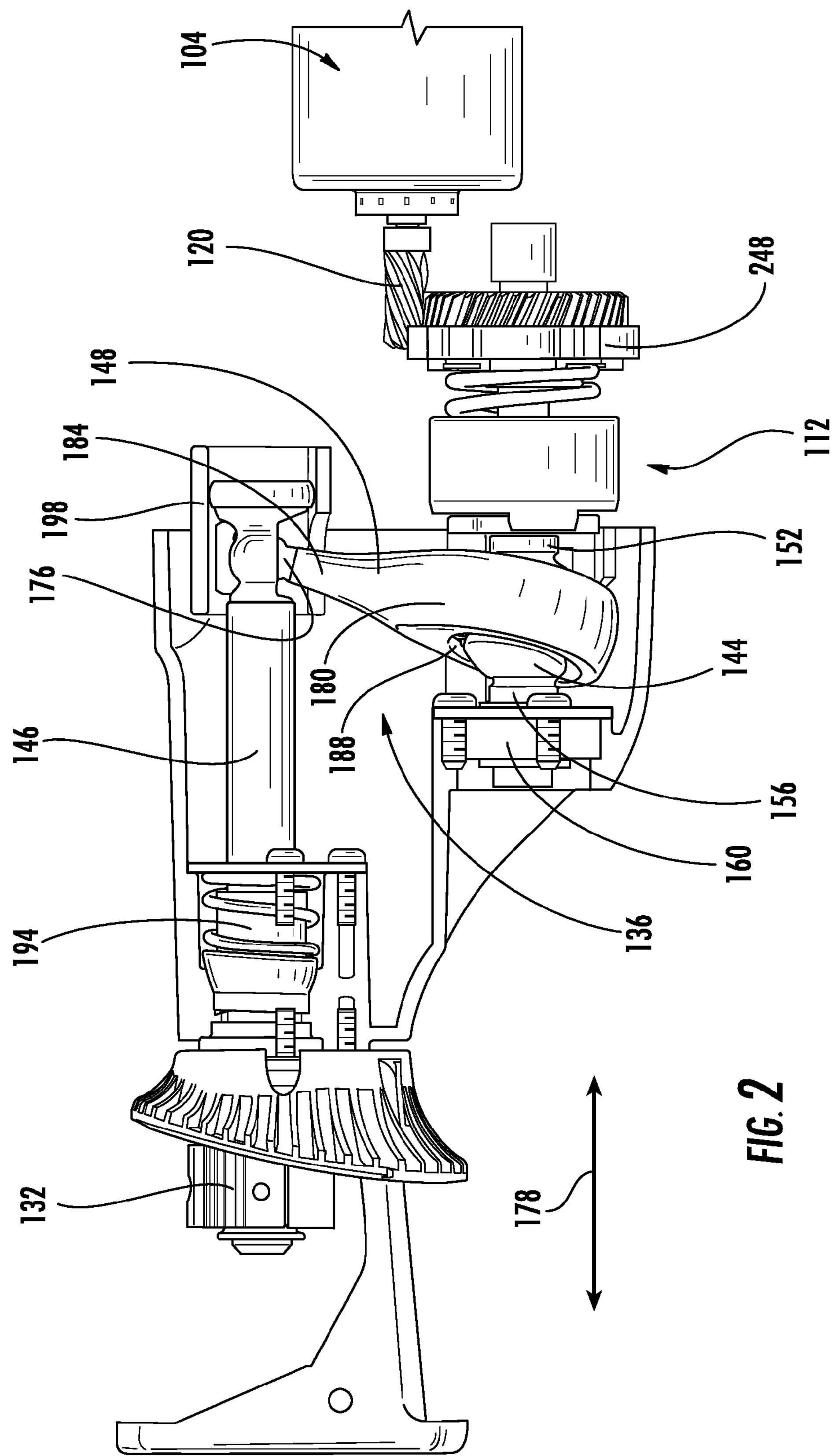
FIG. 2 is a cutaway side elevational view of a portion of the power saw of FIG. 1.

The blade coupling 132 includes components configured to fixedly retain a saw blade 140. For example, the blade coupling 132 may be provided as a chuck, collet, clamping system, or any other connection mechanism, as should be recognized by those of ordinary skill in the art. The blade coupling 132 is movable between a locked configuration and an unlocked configuration. In the locked configuration, the saw blade 140 is connected to the blade coupling 132 and is configured to move with the blade coupling. In FIG. 1, the blade coupling 132 is shown in the locked configuration, with a saw blade 140 connected thereto. In the unlocked configuration, the saw blade 140 is separable from the blade coupling 132 to enable the saw blade 140 to be repaired, replaced, or the like. In FIG. 2, the blade coupling 132 is shown in the unlocked configuration, with the saw blade 140 removed.

As shown in FIG. 2, the reciprocating apparatus 136 includes a wobble shaft 144, a slide shaft 146, and an arm 148. A right end 152 of the wobble shaft 144 is connected to the impact assembly 112. A left end 156 of the wobble shaft 144 is rotatably received by the enclosure 116 and is supported by a bearing structure 160 (also shown in FIGS. 3 and 4).

Figure 3:
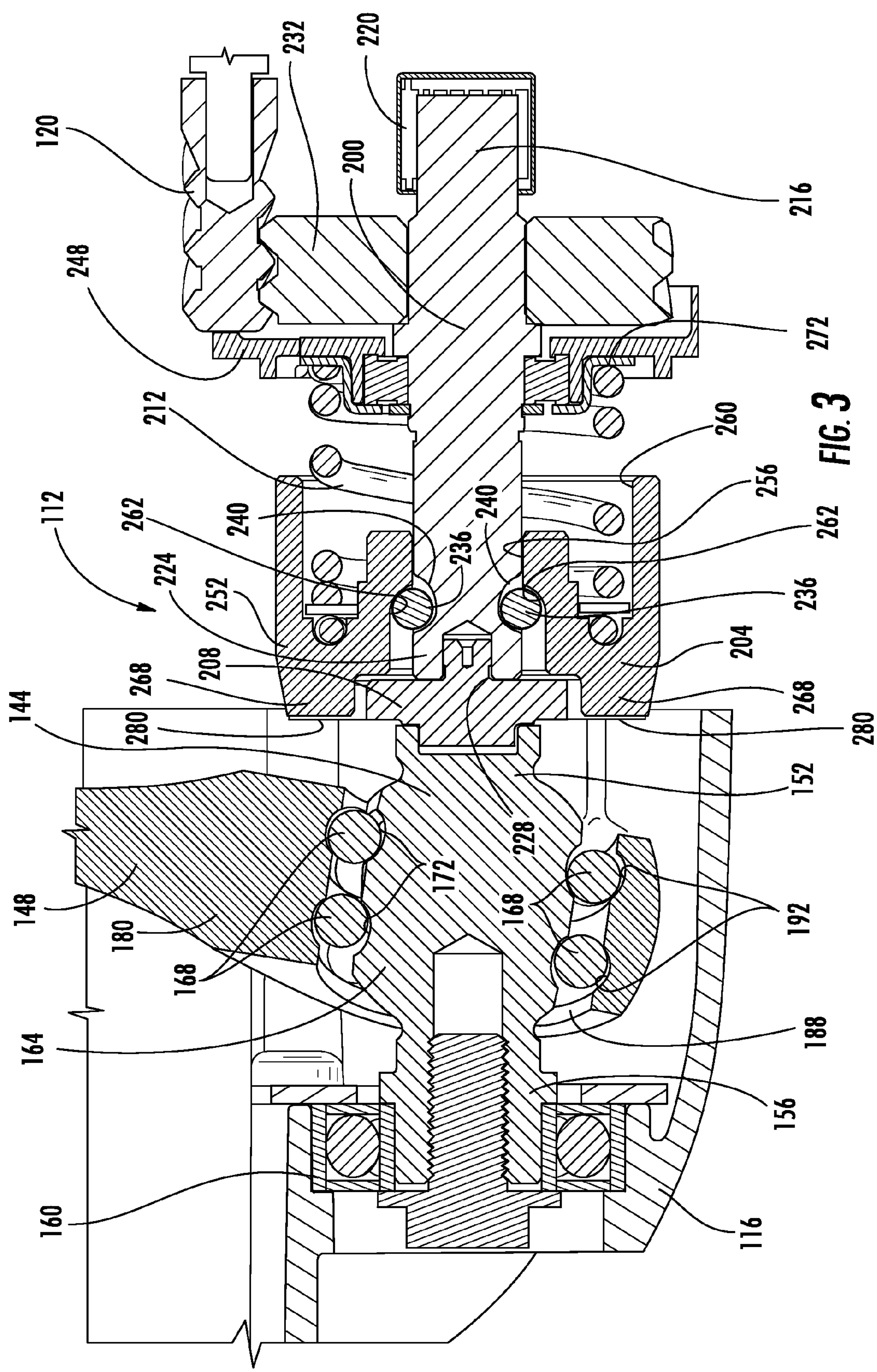
FIG. 3 is a cross sectional view a portion of the power saw of FIG. 1, shown with the hammer member of the impact mechanism in an engaged position.

As shown in FIG. 3, the wobble shaft 144 includes a cylindrically shaped center portion 164, which is oriented at an acute angle relative to a longitudinal axis of the wobble shaft 144. Ball bearings 168 are positioned in races 172 on the center portion 164 to permit the center portion to rotate relative to the arm 148. As the wobble shaft 144 is rotated, the angular orientation of the center portion 164 changes and causes the arm 148 to pivot about the center portion. This pivoting of the arm 148 causes an outer end 176 (shown in FIG. 2) of the arm 148 to move in a reciprocating manner, i.e. to the left and right along the path represented by the arrow 178 in FIG. 2.

With reference FIGS. 2 and 3, the arm 148 includes an enlarged body portion 180, which merges into a post portion 184 (FIG. 2). The body portion 180 defines a wobble opening 188, which receives the wobble shaft 144. Races 192 (FIG. 3) line the interior of the wobble opening 188 and are configured to receive the ball bearings 168. The body portion 180 tapers to the post portion 184 (FIG. 2), which is terminated with the outer end 176 of the arm 148. The outer end 176 of the arm 148 is received by the slide shaft 146. Rotation of the wobble shaft 144 is configured to cause the post portion 184 of the arm 148 to reciprocate to and between a forward position (shown in FIG. 8) and a rearward position (shown in FIGS. 1-4).

As shown in FIG. 2, the slide shaft 146 is slidably retained in the front guide 194 and the rear guide 198, such that the slide shaft is freely slidable in the left and right directions, as represented by the arrow 178. A front end of the slide shaft 146 (i.e. the end near the front guide 194) is connected to the blade coupling 132. A rear end of the slide shaft 146 (i.e. the end near the rear guide 198) is configured to receive the outer end 176 of the arm 148. In response to movement of the outer end 176 of the arm 148, the slide shaft 146 and the blade coupling 132 reciprocate relative to the front guide 194 and the rear guide 198.

With reference again to FIG.1, the saw blade 140 is a reciprocating saw blade. The saw blade 140 includes a plurality of cutting teeth 196 positioned on a lower blade edge. A blade end portion (not shown) of the saw blade 140 is configured to be received by and connected to the blade coupling 132 of the blade retaining assembly 108. The saw blade 140 cuts a workpiece in response to being positioned in contact with the workpiece while the saw blade is being reciprocated. Accordingly, the saw blade 140 is distinct from boring tools, such as drill bits, which cut/bore a workpiece in response to being rotated while contacting a workpiece.

Figure 4:
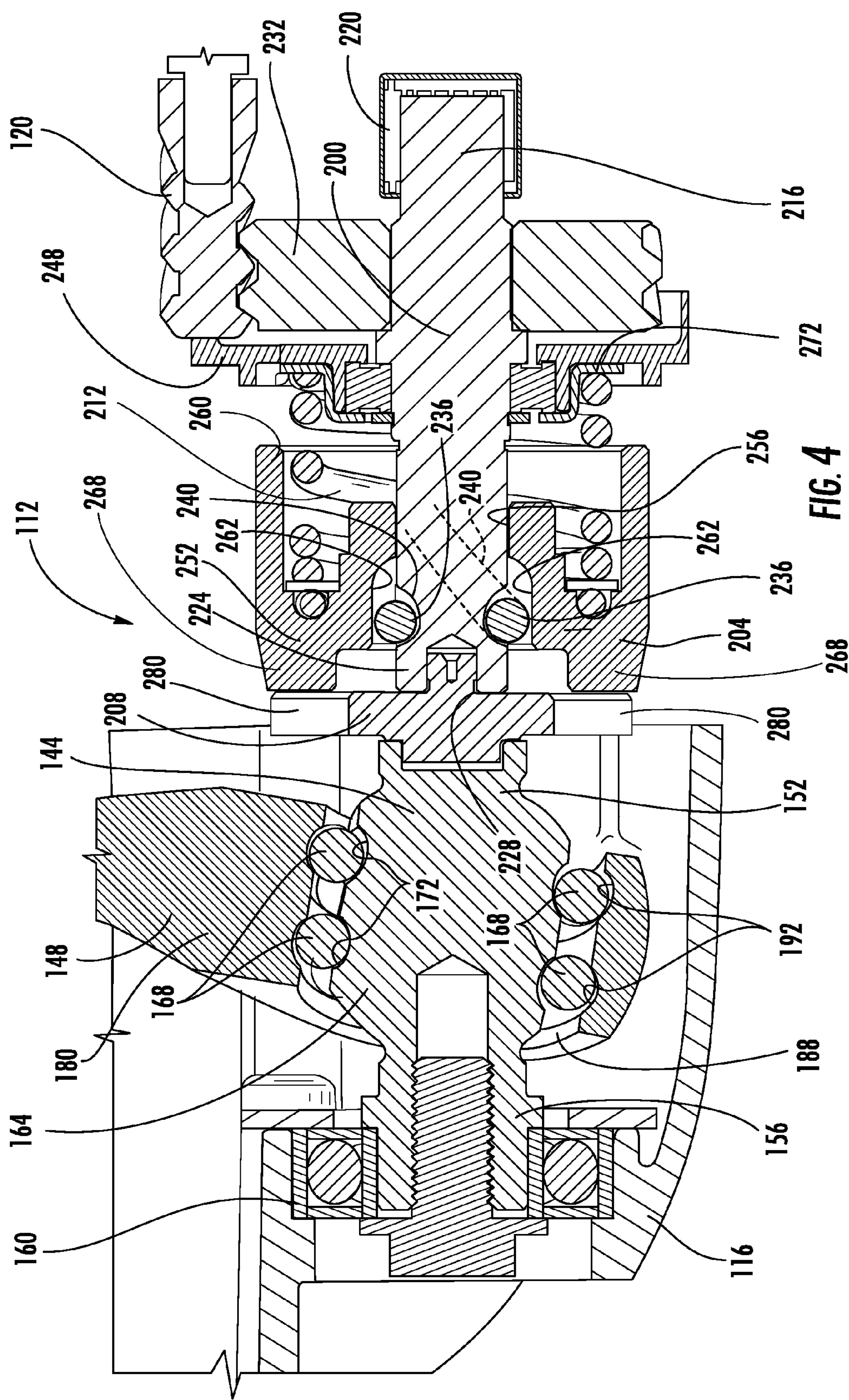
FIG. 4 is a cross sectional view of a portion of the power saw of FIG. 1, shown with the hammer member of the impact mechanism in a disengaged position.

As shown in FIGS. 3 and 4, the impact assembly 112 of the power saw 100 includes an input shaft 200, a hammer member 204, an anvil member 208, and a spring 212. The input shaft 200 includes a right end 216, a left end 224, and two grooves referred to as splines 240. The right end 216 of the input shaft 200 is configured to be rotatably supported by a bearing structure 220 received by the enclosure 116. The left end 224 of the input shaft 200 defines an anvil opening 228, which is configured to receive a portion of the anvil member 208. A portion of the input shaft 200 near the right end 216 is connected to the gear member 232.

The splines 240 each define a generally helical groove in the input shaft 200. The splines 240 are angled with respect to a longitudinal axis of the input shaft 200. A leftmost portion of each of the splines 240 is shown in FIGS. 3 and 4. Additionally, in FIG. 4, an exemplary position of one of the splines 240 is shown in phantom. The splines 240 may alternatively be any type of thread or groove formed in input shaft 200. The splines 240 are configured to receive a portion of the bearing balls 236, and are configured to secure the hammer member 204 to the input shaft 200, as described further below.

The gear member 232 is configured to meshingly engage the geared portion of the output shaft 120 of the electric motor 104. The gear member 232 is fixedly connected to the input shaft 200, such that the gear member and the input shaft rotate in response to rotation of the output shaft 120. A guard member 248 is positioned to cover at least a portion of the gear member 232.

As shown in FIGS. 3 and 4, the hammer member 204 is coupled to the input shaft 200 and includes a hammer body 252, which defines a central opening 256 and a spring cavity 260. The hammer body 252 has a generally cylindrical shape. The central opening 256 is a concentric opening formed in the body 252, which is configured to receive a portion of the input shaft 200. The spring cavity 260 is a concentric cavity formed in the body 252. The spring cavity 260 is positioned radially outward from the central opening 256. The hammer member 204 is formed from relatively hard materials such as, steel, iron, and the like.

Figure 5:
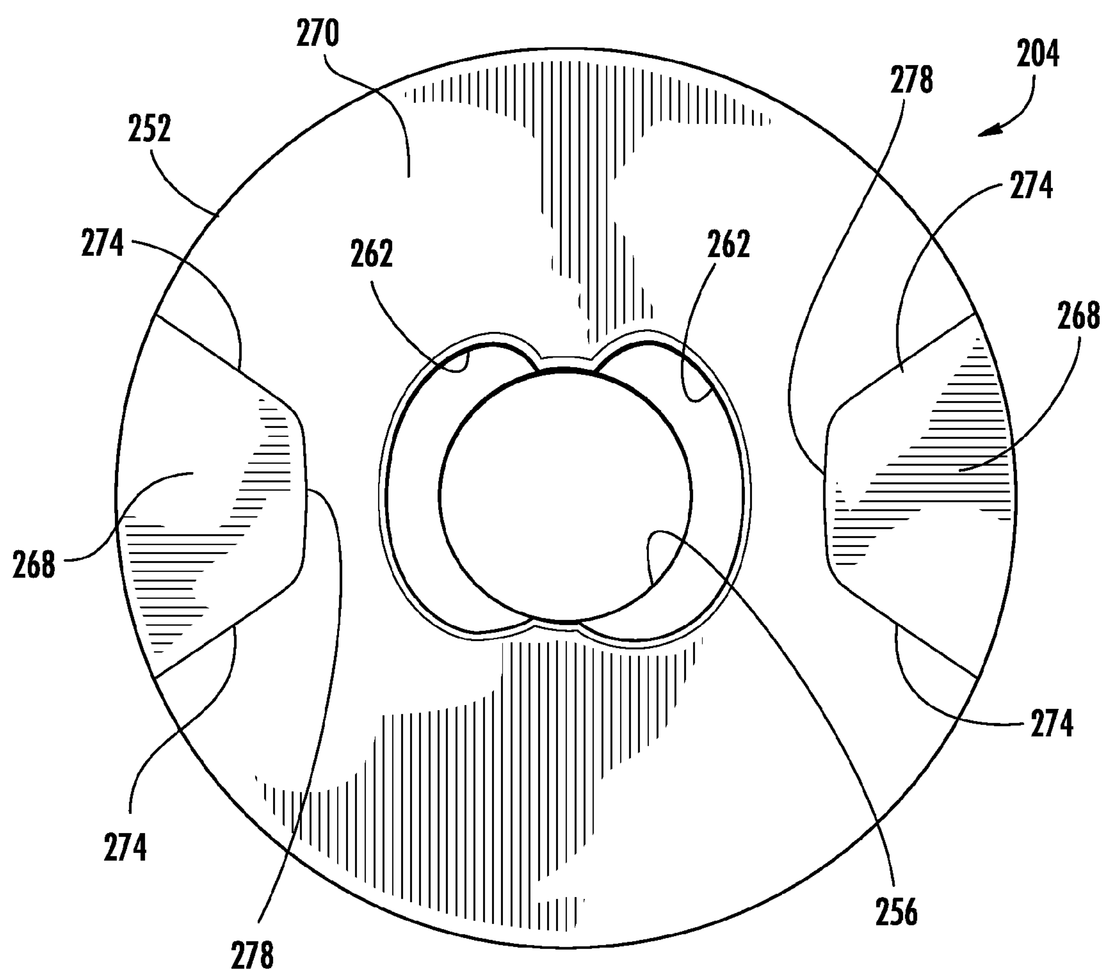
FIG. 5 is a top plan view of the hammer member of the impact mechanism of FIG. 1, shown in isolation.

With reference to FIGS. 4 and 5, the hammer member 204 defines the helical grooves 262. The grooves 262 are positioned within the central opening 256 and extend radially outward from the hammer body 252. As shown in FIGS. 3 and 4, the bearing balls 236 are partially received by the grooves 262.

With continued reference to FIGS. 4 and 5, the hammer member 204 further includes two hammer projections 268. The hammer projections 268 extend from a substantially flat surface 270 of the hammer body 252 toward the anvil member 208. As shown most clearly in FIG. 5, the hammer projections 268 are diametrically opposed and are equally sized and shaped, such that the hammer member 204 is balanced about a longitudinal axis of the hammer member. The hammer projections 268 are approximately shaped like a sector, which is bounded by the side surfaces 274, the arc-shaped surface 278, and the exterior surface of the hammer body 252. Each of the side surfaces 274 defines a shoulder, which is configured to engage a portion(s) of the anvil member 208. The hammer projections 268 are integrally formed with the hammer body 252. The hammer member 204 is positioned on the input shaft 200 by the spring 212.

As shown in FIGS. 3 and 4, the spring 212 of the impact assembly 112 is positioned at least partially within the spring cavity 260. The spring 212 is a compression spring, which biases the hammer member 204 toward the wobble shaft 144. A first end of the spring 212 is seated in the spring cavity 260 and a second end of the spring is seated against a spring plate 272, which is fixedly connected to the input shaft 200.

The spring 212 biases the hammer member 204 against the bearing balls 236. The configuration of the grooves 262 and the splines 240, enables the bearing balls 236 to prevent the spring 212 from biasing the hammer member 204 any closer to the wobble shaft 144 than the position shown in FIG. 3.

The hammer member 204 is positionable relative to the input shaft 200 in a rotationally engaged position (FIG. 3) and a rotationally disengaged position (FIG. 4). In the engaged position, the hammer member 204 is located in a forward position in which the hammer member is moved toward the blade 140. In this position, the projections 268 engage a pair of anvil projections 280 (FIG. 4) of the anvil member 208. In the engaged position rotation of the input shaft 200 results in rotation of the hammer member 204 and the anvil member 208.

In the disengaged position, the hammer member 204 is located in a rearward position in which the hammer member is moved toward the electric motor 104. To move the hammer member 204 from the engaged position to the disengaged position, the hammer member is moved toward the gear member 232, against the biasing force of the spring 212 and away from the anvil member 208. In the disengaged position, the hammer projections 268 are positioned behind the anvil projection 280, such that the hammer member 204 may be rotated without the hammer projections rotationally engaging the anvil projections. Accordingly, in the disengaged position, rotation of the input shaft 200 results in rotation of the hammer member 204; however, but does not result in rotation of the anvil member 208.

Figure 6:
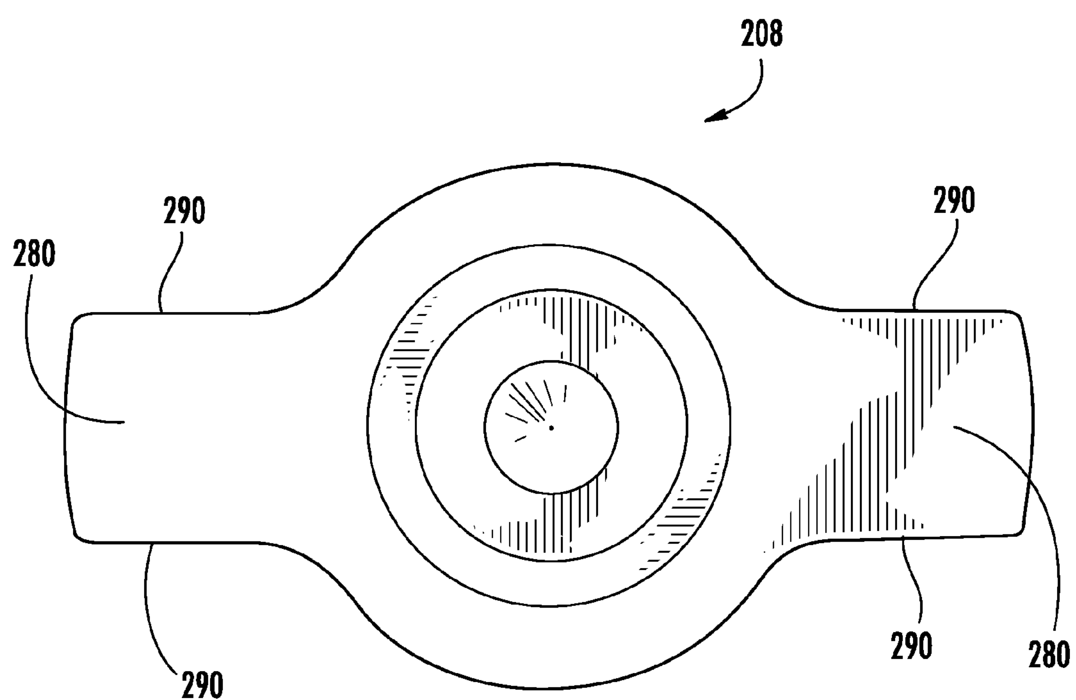
FIG. 6 is a top plan view of the anvil member of the impact mechanism of FIG. 1, shown in isolation
Figure 7:
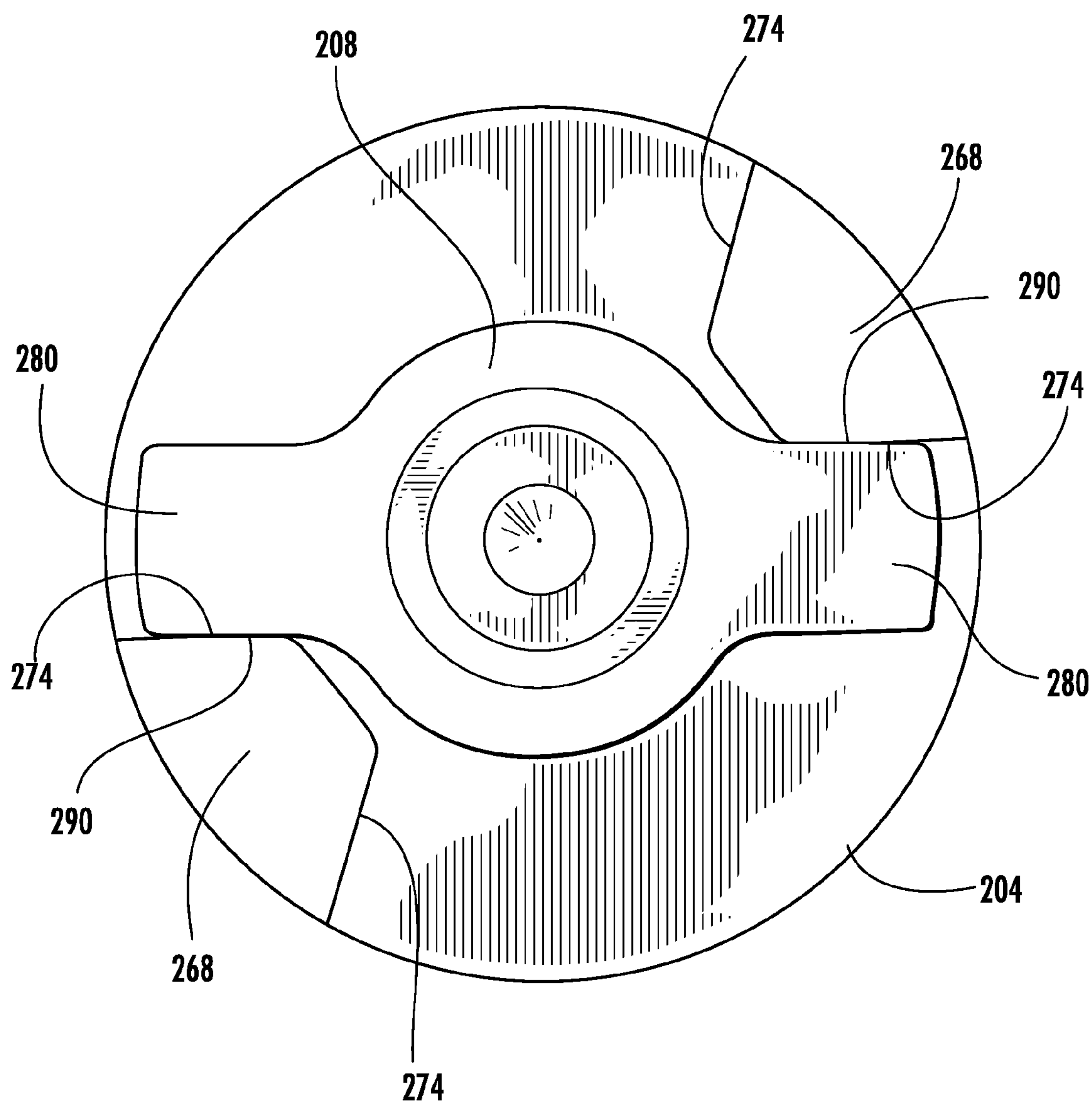
FIG. 7 is a top plan view of the hammer member and the anvil member of the impact mechanism of FIG. 1, with the hammer member and the anvil member shown in isolation.
Figure 8:
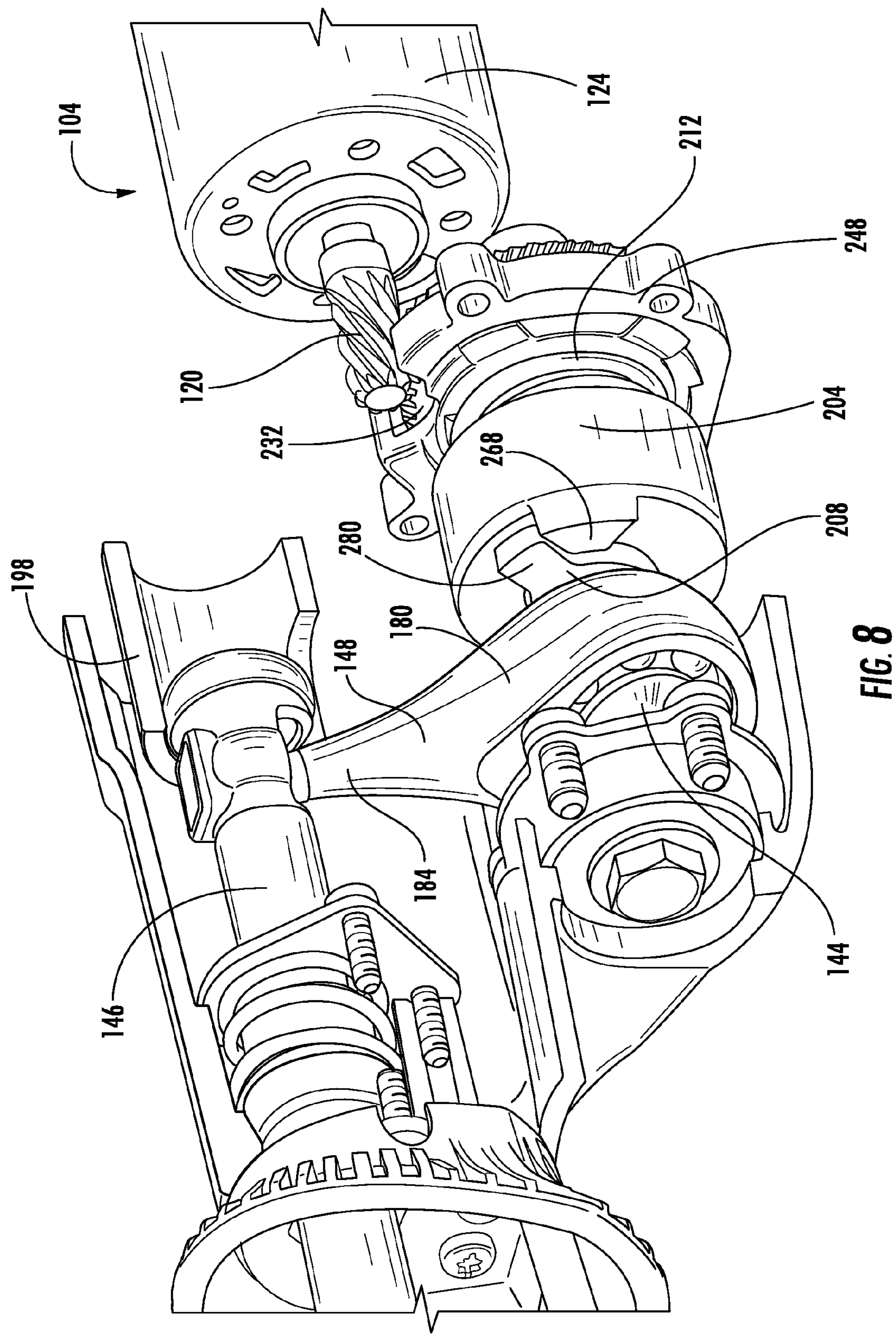
FIG. 8 is a cutaway perspective view of a portion of the power saw of FIG. 1.

As shown in FIGS. 4 and 6, the anvil member 208 is fixedly connected to the wobble shaft 144 and is rotatably received by the input shaft 200. The anvil member 208 includes a pair of anvil projections 280, which extend from diametrically opposite sides of anvil member. The anvil projections 280 are substantially equally sized and shaped, such that the anvil member 208 is balanced about a longitudinal axis of the anvil member. Each anvil projection 280 defines a first and a second anvil surface 290 configured to be contacted and struck by the side surfaces 274 of the hammer projections 268 of the hammer member 204. As shown in FIGS. 7 and 8, the anvil projections 280 are positioned such that the hammer projections 268 each contact an anvil surface 290 at the same time. The anvil member 208 is formed from relatively hard materials such as steel, iron, and the like.

The impact assembly 112 operates in either a non-impact mode or an impact mode depending on the magnitude of a mechanical load exerted on the blade retaining assembly 108. This load is referred to as "the blade load." When the blade load is below a threshold value (also referred to as a predetermined value), the impact assembly 112 operates in the non-impact mode. When the blade load is equal to or greater than the threshold value, the impact assembly 112 operates in the impact mode.

When the impact assembly 112 operates in the non-impact mode, the hammer member 204 is positioned in the engaged position (FIG. 3), such that the hammer member is maintained in a fixed position relative to the anvil member 208 and the input shaft 200. Accordingly, rotation of the motor shaft 120 is transferred through the impact assembly 112 to the wobble shaft 144. As described above, rotation of the wobble shaft 144 results in reciprocation of the blade 140 relative to the enclosure 116. In the non-impact mode the blade 140 is reciprocated smoothly with a generally constant magnitude of torque.

When the impact assembly 112 operates in the impact mode, the hammer member rapidly cycles between the engaged position and the disengaged position. In particular, during operation of the power saw 100, if the blade load becomes equal to or greater than the threshold value, the impact assembly 112 automatically changes operation from the non-impact mode to the impact mode. The change from the non-impact mode to the impact mode occurs when the force to rotate the anvil member 208 and the wobble shaft 144 is greater than the force to cause the hammer member 204 to move to the disengaged position.

The force to cause the hammer member 204 to move to the disengaged position is determined, at least in part, by the spring constant of the spring 212. As described above, the spring 212 applies a biasing force to the hammer member 204, which biases the spring in the engaged position. When the blade load exceeds the threshold value, however, the input shaft 200 begins to rotate relative to the hammer member 204. As a result of the rotation of the input shaft 200 relative to the hammer member 204, the hammer member is drawn toward the gear member 232, thereby compressing the spring 212. The configuration of the grooves 262 and the splines 240, cause the hammer member 204 to move toward the gear member 232. The bearing balls 236 roll in the grooves 262 and the splines 240 as the hammer member 204 moves relative to the input shaft 200. Accordingly, the threshold value of the impact assembly 112 is related to the spring constant of the spring 212. Increasing the spring constant of the spring 212 increases the threshold value and decreasing the spring constant of the spring decreases the threshold value.

When the hammer member 204 enters the disengaged position the blade load is not transferred to the hammer member, and the input shaft 200 is able to easily rotate the hammer member. Additionally, when the hammer member 204 is in the disengaged position, the driving force on the anvil member 208 and the wobble shaft 144 is suspended. Accordingly, with the hammer member 204 in the disengaged position, the input shaft 200 rotates the hammer projections 268 past/behind the anvil projections 280. After the input shaft 200 rotates the hammer projections 268 past the anvil projections 280, the spring 212 forces the hammer member 204 toward the anvil member 208, such that the hammer member reenters the engaged position. It is noted that in some embodiments, as the hammer projections 268 are rotated past the anvil projections 280 a front surface of the hammer projections may contact a rear surface of the anvil projections; however, the hammer projections are disengaged from the anvil projections since the hammer projections are rotatable relative to the anvil projections.

When the hammer member 204 reenters the engaged position, the input shaft 200 rotates the hammer member 204 without resistance from the blade load until the hammer projections 268 impact the anvil projections 280. The hammer projections 268 may forcefully strike the anvil projections, thereby applying a torque pulse to the anvil member. The magnitude of the torque pulse is proportional to the mass of the hammer member 204 and the torque of the output shaft 120, among other factors.

The impact assembly 112 remains in the impact mode (i.e. the hammer member 204 cycles between the engaged position and the disengaged position) so long as the blade load is greater than the threshold value. In particular, after the hammer member 204 strikes the anvil member 208 the blade load may remain above the threshold value, which causes the impact assembly 112 to remain in the impact mode. Accordingly, the hammer projections 268 intermittently strike/impact the anvil projections 280, each time the hammer member 204 reenters the engaged position. These intermittent torque pulses are transferred to the blade 140.

Alternatively, after the hammer member 204 strikes the anvil member 208, the blade load may fall below the threshold value. Specifically, depending on the type of workpiece, the torque pulses may result in rotational movement of the anvil member 208, which causes the blade 140 to become dislodged from the workpiece or may cause the blade to be driven through a restrictive workpiece. It may be noted that when the impact assembly 112 is in the impact mode the anvil member 208 and the hammer member 204 may rotate with different angular velocities or may rotate with different average velocities.

As briefly described above, the blade load is determined by the force required to move the saw blade 140 through a workpiece. When the saw blade 140 is not in contact with a workpiece, very little force is needed to reciprocate the saw blade. When the saw blade 140 is pressed against a workpiece, however, the cutting teeth 196 dig into the workpiece and increase the force needed to reciprocate the saw blade. This cutting force is transferred through the saw blade retaining assembly 108 to the anvil member 208 of the impact assembly 112. Accordingly, the force needed to the rotate the anvil member 208 is directly related to the blade load. Furthermore, when the hammer member 204 is in the engaged position the blade load is transferred to the input shaft 200, and when the hammer member is in the disengaged mode the blade load is not transferred to the input shaft.

The impact assembly 112 functions as a clutch between the electric motor 104 and the blade retaining assembly 108, which enables the output shaft 120 of the electric motor 104 to rotate even when movement of the blade 140 is prevented. In particular, when the blade load is greater than the threshold value, the torque from the output shaft 120 serves to compress the spring 212 and to repeatedly move the hammer member 204 to the disengaged position. Accordingly, the blade load may have a magnitude (typically greater than the threshold value), which prevents the anvil member 208 from rotating in response to the rotation and torque pulses of the hammer member 204.

In operation, the power saw 100 reciprocates the saw blade 140 to enable the saw blade to cut a workpiece. The power saw 100 is configured to operate in the non-impact mode during most cutting operations. In the non-impact mode the power saw 100 smoothly reciprocates the saw blade 140 as the saw blade is moved through a workpiece, thereby enabling the saw blade to make clean and controlled cuts through the workpiece.

When the blade load becomes greater than the threshold value, the power saw 100 operates with the impact assembly 112 in the impact mode. Accordingly, the power saw 100 may operate in the impact mode when the saw blade 140 becomes bound or jammed in the workpiece and/or when the saw blade is forcefully pressed against the workpiece, among other situations. The torque pulses generated by the impact assembly 112 assist in overcoming the force that restricts movement of the saw blade 140 and the blade retaining assembly 108. The torque pulses serve to drive the saw blade through the workpiece. When the torque pulses do not overcome the restrictive force upon the saw blade 140, the impact assembly 112 is a clutch, which separates rotation of the output shaft 120 of the electric motor 104 from the blade retaining assembly 108.

The impact assembly 112 enables the power saw 100 to deliver a higher level of torque to the saw blade 140 (i.e cutting power) than other battery powered saws, which do not include the impact mechanism.

Figure 9:
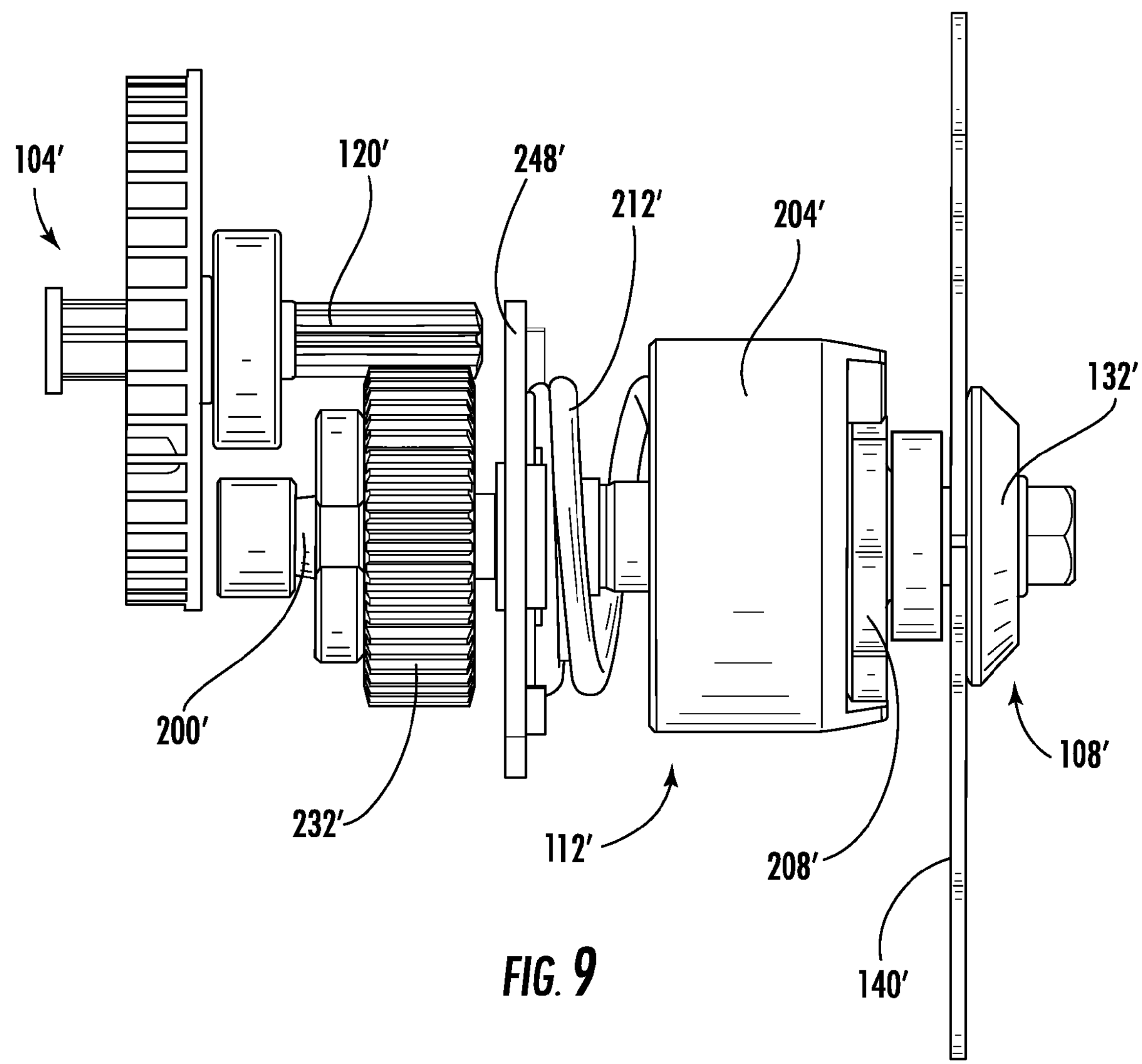
FIG. 9 is a cutaway side elevational view, shown partially in cross section, of a portion of an alternative embodiment of the power saw of FIG. 1.

FIG. 9 shows a portion of an alternative embodiment of a power saw as described herein. The power saw of FIG. 9 includes an electric motor 104'; an impact assembly 112' having an input shaft 200', a hammer member 204', an anvil member 208', and a spring 212'; a gear member 232'; a blade retaining assembly 108' having a blade coupling 132'; and a guard member 248' each at least partially positioned within an enclosure(not shown).The electric motor 104' includes an output shaft 120' which is rotationally coupled to the input shaft 200' of the impact assembly 112'. The blade retaining assembly 108' does not include a reciprocating apparatus 136 (FIG. 1). Instead, the anvil member 208' is configured to transfer rotation directly to the blade retaining assembly 108', such that a saw blade 140' rotates instead of reciprocates. The saw blade 140' is a circular saw blade.

The impact assembly 112' operates in the impact mode and the non-impact mode in the same manner as the impact assembly 112. Accordingly, during normal cutting operations the electric motor 104' rotates the saw blade 140' smoothly. When the blade load exerted on the saw blade 140' exceeds a threshold value, however, the impact assembly 112' operates in the impact mode and generates torque pulses configured to drive the saw blade through the workpiece. The impact assembly 112' also acts as a clutch in the same manner as the impact assembly 112'.

While the power saw 100, 100' has been illustrated and described in detail in the figures and the foregoing description, the same should be considered as illustrative and not restrictive in character. It should be understood that only the preferred embodiments have been presented and that all changes, modifications, and further application that come within the spirit of the disclosure are desired to be protected.

What is claimed is:

1. A power saw comprising:

an electric motor including a motor shaft;

an impact assembly including (i) an input shaft coupled to said motor shaft, (ii) a hammer member movably positioned on said input shaft and including at least one hammer projection, (iii) an anvil member configured for rotation relative to said input shaft and including at least one anvil projection, and (iv) a biasing member configured to bias said hammer member toward said anvil member so that said at least one hammer projection is in a position of rotational engagement in a rotational direction with said at least one anvil projection; and a blade retaining assembly including (i) a blade shaft configured for rotation with said anvil member, and (ii) a blade coupling coupled to said blade shaft and configured to connect to a saw blade, wherein said impact assembly is configured for intermittent impacting in said rotational direction of said at least one hammer projection against said at least one anvil projection to generate torque pulses that tend to rotate said anvil member and said blade shaft in said rotational direction.

2. The power saw as claimed in claim 1, wherein said input shaft is configured to rotate said at least one hammer projection against said at least one anvil projection to generate an impact of said intermittent impacting.

3. The power saw as claimed in claim 1, wherein:

said impacting assembly is configured such that said hammer member moves axially away from said anvil member to a position of rotational disengagement with said anvil member in response a mechanical load on said blade retaining assembly exceeding a threshold value, and said at least one hammer projection is configured to be positioned behind said at least one anvil projection when said hammer member is in said position of rotational disengagement.

4. The power saw as claimed in claim 3, wherein said impacting assembly is configured to transfer torque from said hammer member to said anvil member without said intermittent impacting when said mechanical load on said blade retaining assembly is less than or equal to said threshold value.

5. The power saw as claimed in claim 3, wherein:

said input shaft defines at least one helical groove, said hammer member defines at least one corresponding helical groove, said impacting assembly includes at least one bearing ball positioned in said at least one helical groove and said at least one corresponding helical groove, and said input member is configured to rotate relative to said hammer member to position said hammer member in said position of rotational disengagement.

6. The power saw of claim 1, wherein a battery assembly supplies said electric motor with electrical energy.

7. The power saw of claim 1, wherein:

said blade retaining assembly further includes a reciprocating apparatus coupled to said blade shaft, and said reciprocating apparatus is configured to reciprocate said blade coupling in response to rotation of said blade shaft.

8. The power saw of claim 1, wherein said saw blade is a circular saw blade.

* * * * *